United States Patent
Lee et al.

(10) Patent No.: US 11,317,754 B2
(45) Date of Patent: May 3, 2022

(54) SYSTEM INTERWORKING BETWEEN A COOKING APPARATUS AND A KITCHEN DEVICE

(71) Applicant: LG ELECTRONICS INC., Seoul (KR)

(72) Inventors: Sangcheol Lee, Seoul (KR); Wontae Kim, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 16/363,115

(22) Filed: Mar. 25, 2019

(65) Prior Publication Data

US 2019/0216261 A1    Jul. 18, 2019

Related U.S. Application Data (63) Continuation of application No. 15/202,784, filed on Jul. 6, 2016, now Pat. No. 10,238,234.

(30) Foreign Application Priority Data

Jul. 7, 2015 (KR) .................. 10-2015-0096509

(51) Int. Cl.
   *A47J 27/62* (2006.01)
   *F24C 15/20* (2006.01)
   *F24C 3/12* (2006.01)
   *G05B 15/02* (2006.01)
   *F24C 7/08* (2006.01)

(52) U.S. Cl.
   CPC .............. *A47J 27/62* (2013.01); *F24C 3/126* (2013.01); *F24C 15/20* (2013.01); *F24C 15/2042* (2013.01); *F24C 7/087* (2013.01); *G05B 15/02* (2013.01)

(58) Field of Classification Search
   CPC .......... A47J 27/62; F23N 1/022; F23N 5/003; F23N 5/242; F24C 15/2021; F24C 15/2042; F24C 7/087
   USPC .................................. 99/331, 333, 337, 338
   See application file for complete search history.

(56) References Cited

U.S. PATENT DOCUMENTS

| | | | |
|---|---|---|---|
| 7,866,312 B2 * | 1/2011 | Erdmann | F24C 3/12 126/299 D |
| 9,427,107 B2 | 8/2016 | Reinhart | |
| 10,085,585 B2 * | 10/2018 | Siegel | A47J 36/321 |

(Continued)

FOREIGN PATENT DOCUMENTS

| | | |
|---|---|---|
| JP | H11-294808 | 10/1999 |
| KR | 10-1995-0027265 | 10/1995 |

(Continued)

*Primary Examiner* — Reginald Alexander
(74) *Attorney, Agent, or Firm* — Fish & Richardson P.C.

(57) ABSTRACT

Disclosed is a system interworking between a cooking apparatus for cooking food and a kitchen device in communication with the cooking apparatus, the system comprising a cooking apparatus comprising a first transmitter transmitting an electrical signal to the kitchen device; and a first controller controlling the first transmitter to transmit the electrical signal to the kitchen device; and a kitchen device comprising a second receiver receiving the electrical signal transmitted by the first transmitter; and a second controller controlling the driving of the kitchen device according to the electrical signal received by the second receiver.

13 Claims, 3 Drawing Sheets

(56) References Cited

U.S. PATENT DOCUMENTS

| | | | |
|---|---|---|---|
| 10,670,278 B2 * | 6/2020 | Ji | ........................... F24C 7/087 |
| 2002/0129809 A1 | 9/2002 | Liese | |
| 2012/0092139 A1 | 4/2012 | Ehrensberger | |
| 2014/0174429 A1 | 6/2014 | Fuhge | |
| 2015/0148980 A1 | 5/2015 | Singer | |
| 2015/0351145 A1 | 12/2015 | Burks | |
| 2015/0374162 A1 | 12/2015 | Nonaka | |
| 2016/0273778 A1 | 9/2016 | Son | |

FOREIGN PATENT DOCUMENTS

| | | |
|---|---|---|
| KR | 20-1998-0015201 | 6/1998 |
| KR | 10-1390165 | 4/2014 |

* cited by examiner

SYSTEM INTERWORKING BETWEEN A COOKING APPARATUS AND A KITCHEN DEVICE

CROSS-REFERENCE TO RELATED APPLICATIONS

This application is a continuation of U.S. application Ser. No. 15/202,784, filed on Jul. 6, 2016, now allowed, which claims priority to Korean Patent Application No. 10-2015-0096509 filed on Jul. 7, 2015 in Korea, the entire contents of which are hereby incorporated by reference in their entirety.

BACKGROUND OF THE DISCLOSURE

Field of the Disclosure

Embodiments of the present disclosure relate to a system interworking between a cooking apparatus and a kitchen device.

Background of the Disclosure

Generally, a cooking apparatus means an acronym of the words a mechanism and an apparatus used to cook food. The cooking apparatus may cook food by using the thermal energy generated in gas combustion or using electricity in driving a motor or generating radio waves. Examples of the cooking apparatus include a gas range, an oven, a microwave oven, and the like.

Meanwhile, a kitchen device means a generic term for a machine or device which is used or arranged in a kitchen. Such a kitchen device includes cooking tools and is used as a broad term including a hood for a gas range to remove smell of food and TV arranged in a kitchen.

In recent, there are increasing demands for a system interworking between cooking apparatuses and kitchen devices to facilitate use convenience by automatically operating kitchen devices when cooking food using such cooking tools.

For example, when a user cooks food using a cooking apparatus such as a gas range, food smell or smoke is generated and a hood for a gas range is operated to get rid of the smell or smoke. However, a user has to put the hood into operation additionally.

The cooking apparatus for cooking food generally uses gas or electricity, which leads to safety concerns.

SUMMARY OF THE DISCLOSURE

Accordingly, an object of the present invention is to address the above-noted and other problems.

An object of the present disclosure is to provide a system interworking between a cooking apparatus and a kitchen device which improves user convenience by automatically operating the kitchen device when a user cooks food using the cooking apparatus.

Another object of the present disclosure is to provide a system interworking between a cooking apparatus and a kitchen device which automatically operates a range food as one example of the kitchen device when the user cooks food using the cooking apparatus.

A further object of the present disclosure is to provide a system interworking between a cooking apparatus and a kitchen device which may prevent the safety problems generated in using the cooking apparatus.

Embodiments of the present disclosure may provide a system interworking between a cooking apparatus for cooking food and a kitchen device in communication with the cooking apparatus, the system comprising a cooking apparatus comprising a first transmitter transmitting an electrical signal to the kitchen device; and a first controller controlling the first transmitter to transmit the electrical signal to the kitchen device; and a kitchen device comprising a second receiver receiving the electrical signal transmitted by the first transmitter; and a second controller controlling the driving of the kitchen device according to the electrical signal received by the second receiver.

The cooking apparatus may further comprise a heat source for cooking food; and a first sensing unit connected to the first controlling and sensing operation of the heat source, and the first controller may control the first transmitter to transmit an electrical signal to the kitchen device, when the first sensing unit senses the operation of the heat source.

The heat source may emit thermal energy, using electricity or gas, and the first sensing unit may sense the thermal energy.

The first sensing unit may be a thermos couple heated by thermal energy and generating electromotive force.

The cooking apparatus may comprise an amplifying circuit amplifying the electromotive force generated by the thermos couple.

The kitchen device may be a hood provided near the cooking apparatus and the hood may comprise a fan controlled by the second controller to suck the smell of cooked food.

The second controller may switch on the fan when the second receiver receives an electrical signal from the first transmitter.

The first controller may control the first transmitter to transmit an electrical signal having information about the size of the electromotive force generated by the thermos couple to the second receiver, and the second controller may control the rotation number of the fan according to the electrical signal having the information about the size of the electromotive force received by the second receiver.

The electrical signal may be transmitted from the first transmitter to the second receiver wirelessly.

The kitchen device may further comprise a second sensing unit sensing smoke of food.

The second controller may increase the rotation number of the fan, when the second sensing unit senses the smoke of food.

The kitchen device may further comprise an alarm unit sending a user information in the form of sound or screen, and the second controller may control the alarm unit to send the user a message of sound or screen, when the second sensing unit senses the smoke of food.

The system interworking between the cooking apparatus and the kitchen device may further comprise a second transmitter provided in the kitchen device and transmitting an electrical signal to the cooking apparatus, when the second sensing unit senses the smoke of food; and a first receiver provided in the cooking apparatus and receiving the electrical signal transmitted from the kitchen device, and the first controller may stop the operation of the heat source according to the electrical signal received by the first receiver.

The embodiments have following advantageous effects. According to at least one of the embodiments of the present disclosure, the system interworking between a cooking apparatus and a kitchen device may improve user convenience by automatically operating the kitchen device when a user cooks food using the cooking apparatus.

The system interworking between a cooking apparatus and a kitchen device may automatically operate a range food as one example of the kitchen device when the user cooks food using the cooking apparatus.

The system interworking between a cooking apparatus and a kitchen device may prevent the safety problems generated in using the cooking apparatus.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Referring to the accompanying drawings, a system interworking between a cooking apparatus and a kitchen device in according to one embodiment of the present disclosure will be described in detail. Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
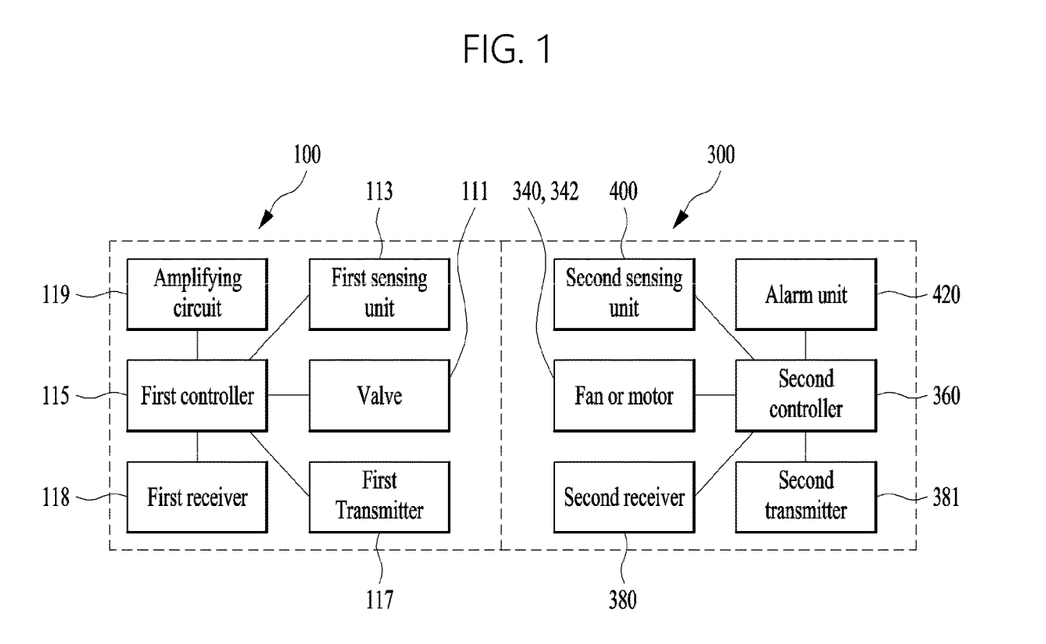
FIG. 1 is a block diagram illustrating a system interworking between a cooking apparatus and a kitchen device in accordance with the present disclosure.

FIG. 1 is a block diagram illustrating a system interworking between a cooking apparatus and a kitchen device in accordance with the present disclosure. Hereinafter, the system interworking between the cooking apparatus and the kitchen device will be described referring to FIG. 1.

The system interworking between the cooking apparatus and the kitchen device may include a cooking apparatus 100 for cooking food and a kitchen device 300 in communication with the cooking apparatus 100.

The cooking apparatus 100 may include a first transmitter 117 transmitting an electrical signal to the kitchen device 300 and a first controller 115 implemented to control the first transmitter 117 to transmit the electrical signal to the kitchen device 300. The kitchen device 300 may include a second receiver 380 configured to receive the electrical signal transmitted by the first transmitter 117 and a second controller 360 implemented to control driving of the kitchen device 300 according to the electrical signal received by the second receiver 117.

While the user is cooking food using the cooking apparatus 100, the first controller 115 converts the information which indicates food cooking into an electrical signal, using the first transmitter 117 and sends the electrical signal to the second receiver 380. The second controller 360 receives the electrical signal from the second receiver 380 and controls the kitchen device 300 based on the electrical signal. Accordingly, the system interworking between the cooking apparatus 100 and the kitchen device 300 may be realized.

The cooking apparatus 100 includes a heat source to generate the thermal energy used in cooking food and provides the physical force for grinding and crushing food or food ingredients, using a motor 342. Also, cell or molecule unit energy of food which will be cooked is improved using electric waves. Especially, the heat source generates thermal energy in the heated resistor (not shown) by allowing electricity to flow to a resistor (not shown) or combusting gas.

A first sensing unit 113 provided in the cooking apparatus 100 may sense the heat or thermal energy generated in the heat source. Once the first sensing unit 113 senses the heat or thermal energy, the first controller 115 controls the first transmitter 117 to transmit the electrical signal to the kitchen device 300. In other words, the first controller 115 of the cooking apparatus may send the information that the heat or thermal energy is generated in the heat source of the cooking apparatus 100 to the kitchen device 300 via the electrical signal.

The first sensing unit 113 may include a temperature sensor to sense the heat or thermal energy. Such a temperature sensor means a sensor configured to covert and sense heat or temperatures into electric currents and voltages. The temperature sensor is classified into a contact type and a non-contact type according to presence of contact with a measuring object. Examples of the contact type temperature sensor include a thermos couple, a thermistor, an IC temperature sensor, a resistance thermometer and the like. Examples of the non-contact type temperature sensor include an IR sensor, an infrared radiation thermometer and the like.

In the illustrated embodiment of the present disclosure, a thermos couple 113 which is heated by heat or thermal energy to generate electromotive force may be provided as the first sensing unit 113. The thermos couple 113 is the device which generates electromotive force, using a difference between temperatures of two types of metals when a joint of two types of metals in contact with each other is heated (or chilled), so that electric currents flow between the two metals by the generated electromotive force and that the device measures temperature, using the electric currents.

The cooking apparatus 100 may include an amplifying circuit 119 which amplifies the electromotive force generated in the thermos couple 113. The amplifying circuit 119 may be embodied as an auxiliary processer. However, it is preferred that the amplifying circuit 119 is provided in the first controller 115. The amplifying circuit 119 amplifies the minute electromotive force generated in the thermos couple 113 at a preset ratio to a band range in which the first controller 115 is able to sense the electromotive force substantially.

The hood 300 having a fan 340 may be provided as the kitchen device 300, and the fan 340 circulating the smell of the food cooked in the cooking apparatus 100 is controlled by the second controller 360 of the kitchen device 300.

As one example, the first sensing unit 113 of the cooking apparatus 100 senses heat and the first transmitter 117 transmits information about the heat sensed from the heat source to the second receiver 380.

In this instance, the second controller 360 of the kitchen device controls the fan 340 to be switched on and rotated when the second receiver 380 receives electrical signal from the first transmitter.

When the user cooks food in the cooking apparatus 100 using the heat source, the fan 340 of the food 300 is automatically put into operation to suck smell of food. In other words, the kitchen device 300 configured to automatically operate in communication with the use of the cooking apparatus 100 has an effect of improved use convenience.

Meanwhile, the first controller 115 of the cooking apparatus 100 may determine the size (or intensity) of the electromotive force generated in the thermos couple. It may determine the size of the electromotive force based on the electromotive force amplified at a preset ratio by the amplifying circuit 119 of the cooking apparatus 100.

The first controller 115 is provided with the electrical signal having information about the size of the electromotive force by the second receiver 380 having received the signal from the first transmitter 117. After that, the second controller 360 of the kitchen device 300 may control the rotation number of the fan 340 according to the size of the electromotive force.

When the electromotive force generated in the thermos couple is large-sized, it may be determined that the intensity of the heat is high and the smell of food may be sucked stronger by raising the rotation number of the fan provided in the kitchen device 300.

The kitchen device 300 may further include a second sensing unit 400 configured to sense the smoke of food and an alarm unit 420 configured to notify the user of the information in the form of sound or screen.

Accordingly, when the second sensing unit 400 of the kitchen device 300 senses the smoke of food, the second controller 360 may increase the rotation number of the fan 3400 so that the suction efficiency of the hood 300 can be improved automatically in case of severe smoke. For example, if the user using the cooking apparatus 100 burns food or overcooks food to generate much smoke, the embodiment of the system interworking between the cooking apparatus and the kitchen device may prevent the smoke of food from getting filled in a kitchen or house.

As one alternative example, the system may controls the alarm unit 420 to send a user a message using sound or screen and the user may be notified and prepared for the danger which too much smoke might generate.

The second sensing unit 400 may be a chemical sensor configured to sense density of carbon dioxide contained in the smoke of food or an optical sensor configured to sense presence of smoke when the smoke of food stops light of a light emitting unit from reaching a light receiving unit.

Meanwhile, when too much smoke of food is generated, the illustrated embodiment of the system may directly remove the cause of the smoke. For that, the kitchen device 300 may include a second transmitter 381 transmitting an electrical signal to the cooking apparatus. The cooking apparatus 100 may further a first receiver 118 receiving the electrical signal transmitted from the kitchen device 300.

The second sensing unit 400 of the kitchen device 300 senses the smoke of food and the second controller 360 controls the second transmitter 381 to transmit an electrical signal to the first receiver 118 of the cooking apparatus 100. In case the first receiver 118 of the cooking apparatus 100 receives an electrical signal, the first controller 115 stops the operation of the heat source and the food cooked on the heat source from getting burned or overcooked.

Methods of the first controller 115 stopping the operation of the heat source may include stopping the supply of electricity and closing a gas path 107 by operating an electromagnetic valve 111 provided in the gas path 107 to stop the supply of gas.

Accordingly, the illustrated embodiment of the system may have an effect of protecting the cooking apparatus user's safety and possessions by removing the cause of the food smoke.

Meanwhile, the first transmitter 117 and the first receiver of the cooking apparatus 100 may be connected with the first transmitter 117 and the second receiver 380 of the kitchen device 300 via wire. However, it is preferred that wireless communication is provided to transceive the electrical signals.

Suitable technologies for implementing the system in accordance with the present disclosure include BLUETOOTH™, Radio Frequency IDentification (RFID), Infrared Data Association (IrDA), Ultra-WideBand (UWB), ZigBee, and the like.

Figure 2:
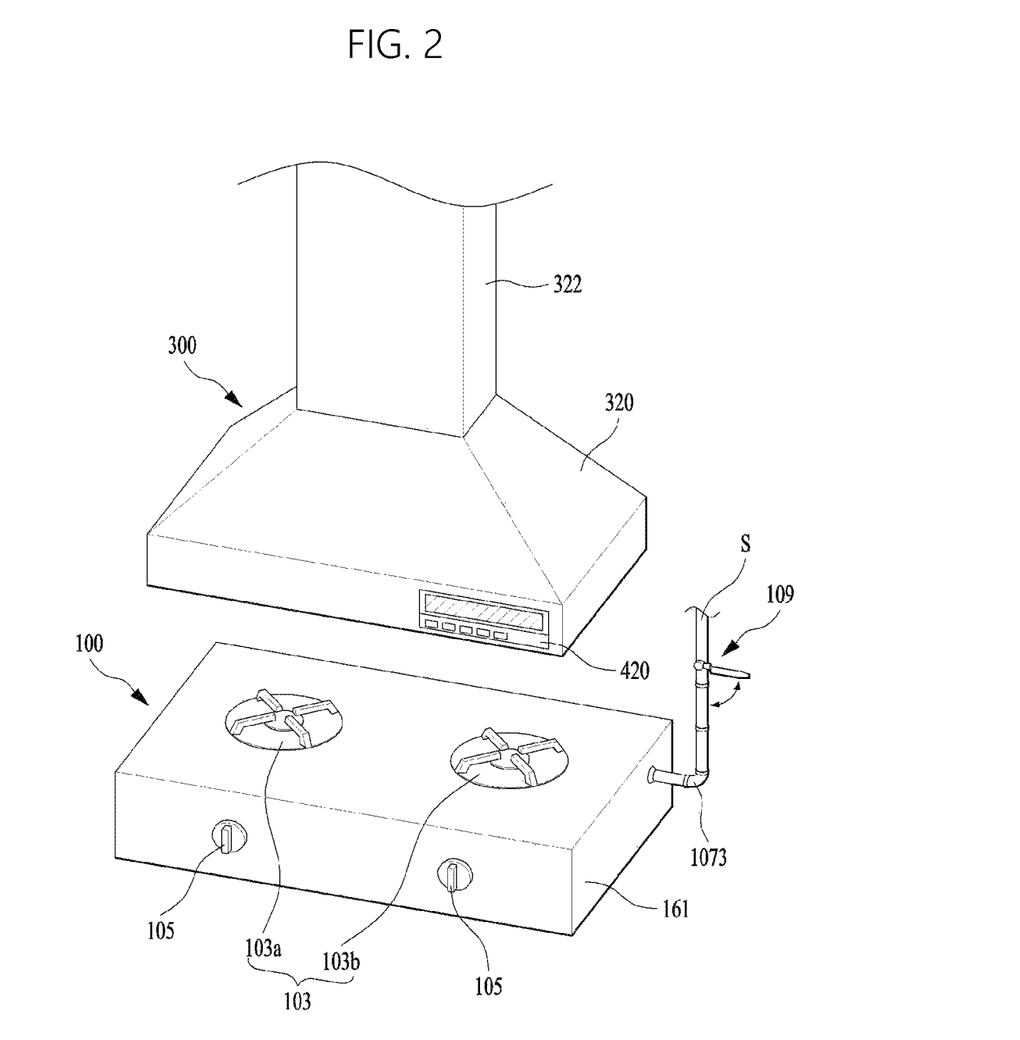
FIG. 2 is a perspective diagram illustrating one example of the system interworking between the cooking apparatus and the kitchen device.
Figure 3:
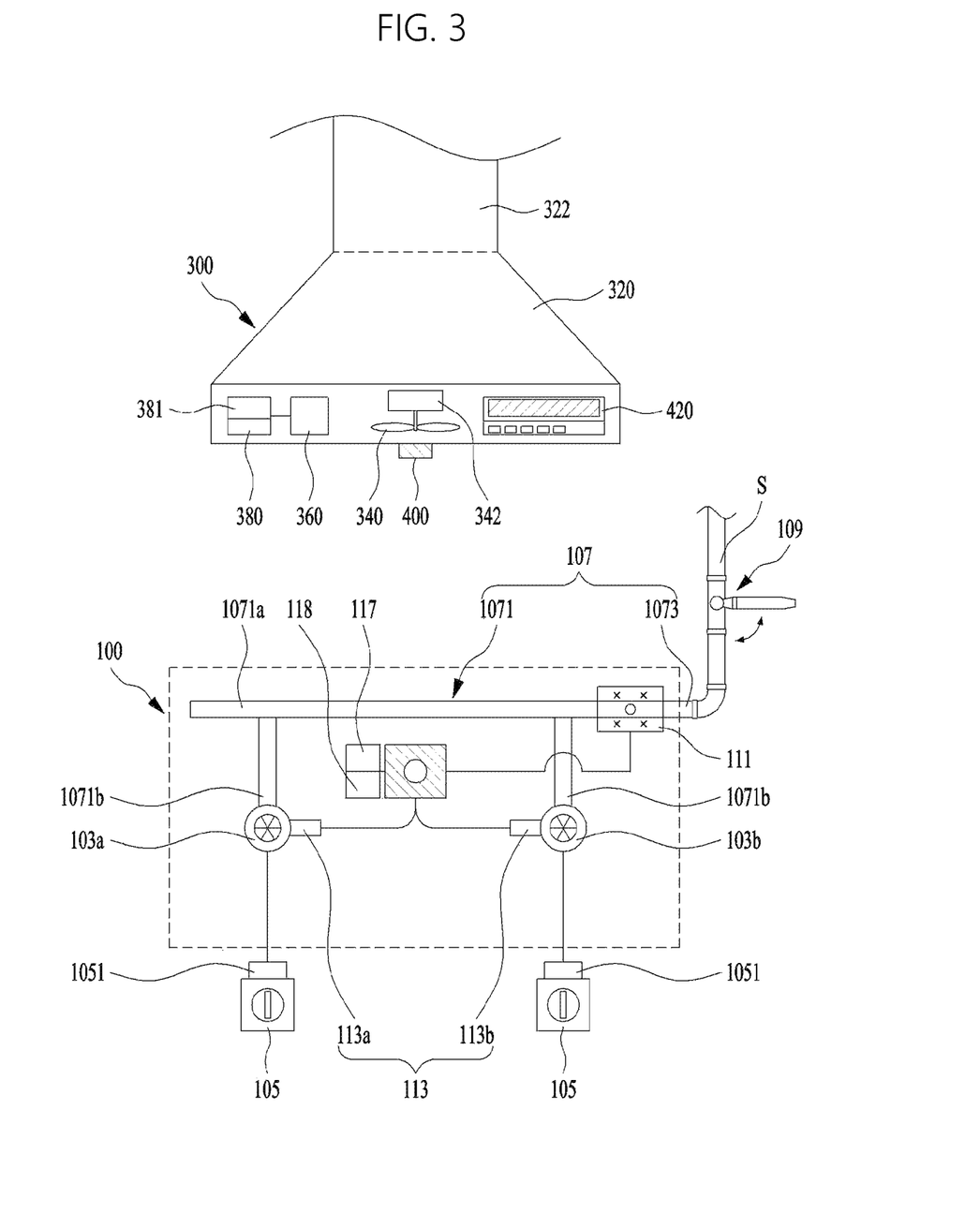
FIG. 3 is a conceptual diagram illustrating one example of the system interworking between the cooking apparatus and the kitchen device.

FIG. 2 is a perspective diagram illustrating one example of the system interworking between the cooking apparatus and the kitchen device and FIG. 3 is a conceptual diagram illustrating one example of the system interworking between the cooking apparatus and the kitchen device.

Referring to FIGS. 2 and 3, the system interworking between the cooking apparatus 100 embodied as a gas range and the kitchen device 300 embodied as a hood will be described as follows.

As one example of the present disclosure, the cooking apparatus 100 may be a gas range 100 configured to heat and cook food. The gas range 100 means the mechanism for cooking food by using the heat source generated by gas combustion.

The gas range may include a cabinet 101, at least one burner combusting gas and a switch 105 igniting gas. Specifically, the gas range uses the gas combusted at the burner as heat source to cook food.

The cabinet 101 defines an exterior appearance of the cooking device in the form of hexahedron with sides of a square and various shapes may be applied to the cabinet 101, not limited to the hexahedron.

The switch 105 may be provided in a front or upper surface of the cabinet 101 as rotary type or pressable type. In this instance, the switch 105 may include an ignition system 1051 configured to ignite gas according to one and off of the switch 105. The ignition system 1051 generates sparks when pressure is applied to and ignites gas. The ignition system 1051 may be provided in the cabinet 101 and have one side connected to the switch 105 and the other wide connected to the burner 103 so as for the sparks to reach the burner 103.

The burner 103 provides heat source by combusting gas and is provided in the upper surface of the cabinet 101. According to the number of the burners, the gas range may be categorized into a double-burner type, a triple-burner type and quadruple-burner type. In the illustrated embodiment, a double-burner gas range 100 having two burners 103 is provided. One of the two burners 103 is defined as first burner 103a and the other one as second burner 103b.

One end of a gas path 107 connected to a gas supply source (S) is connected to the burner 103 and gas is supplied to the burner 103. In other words, the gas path 107 is connectedly arranged between the burner 103 and the gas supply source (S).

The gas path 107 includes a first path 1071 provided in the cabinet 101 and connected to the burner, and a second path 1073 projected outside via one side of the cabinet 101. When the gas supply source (S) is provided in the cabinet 101, the gas path 107 means the first path 1071 provided in the cabinet 101, with being connected to the burner. The first path 1071 includes a main path 1071a connected to the second path 1073 and a plurality of branched pipes 1071b branched to the plurality of the burners.

The gas path 107 may be provided as a pipe made of metal or rubber.

Meanwhile, the gas range 100 of the present disclosure may further include a manual valve allowing the user to open and close the gas path 107 with hands.

The manual valve 109 may be provided between the gas path 107 and the gas supply source (S). In other words, the gas path 107 and the gas supply source (S) are connected to both ends of the manual valve 109, respectively. As an alternative example, the manual valve 107 is connected to the gas supply source (S) and an auxiliary path or pipe is connectedly provided between one end of the manual valve 109 and the gas path 107.

The gas range 100 of the present disclosure may further include a magnetic valve 111 configured to automatically open and close the gas path 107 according to a preset condition.

The magnetic valve 111 is controlled by the first controller 115. The magnetic valve 111 may be provided in the main path 1071a or the first path 1071 to open and close the gas pat 107 or the first path 1071. It is preferred that the magnetic valve 111 is provided in the main path 1071a or the second path 1073 to open and close the main path 1071a or the second path 1073. The shut-off of the gas supply caused by the magnetic valve 111 usually occurs for the safety of preventing a fire and the gas supplied to the cabinet 101 has to be shut off completely.

A solenoid valve (not shown) switched on and off according to an electrical signal may be provided as the magnetic valve 111 or a motor (not shown) may be provided in the magnetic valve 111 to reversibly open and close the valve.

The gas range 100 of the present disclosure may further include a first sensing unit 113 provided in the burner 103. In other words, the first sensing unit 113 is provided at the portion flame is generated by gas combustion in the burner 103 to sense heat of flame.

The first sensing unit 113 may be the thermos couple in the illustrated embodiment of the cooking apparatus in accordance with the present disclosure. When flame is generated in the burner 103, the thermos couple 113 determines whether the gas range is operated according to presence of electric currents or thermoelectromotive force. In this instance, the first sensing unit 113 of the cooking apparatus in the illustrated embodiment is not limited to the thermos couple and any types of temperature sensors may be provided as the first sensing unit 113 only if they are able to sense heat.

In the double-burner gas range 100 in accordance with the present disclosure, the thermos couple 113 may include a first thermos couple 113a provided in the first burner 103a and a second thermos couple 113b provided in the second burner 103b.

Meanwhile, the gas range 100 provided as the illustrated embodiment of the cooking apparatus in accordance with the present disclosure may include a first controller 115.

The first controller 115 determines whether the gas range is operated in case thermoelectromotive force is generated in the thermos couple 113. The first controller 115 controls electrical signal to be sent to the magnetic valve 111 so as to switch the magnetic valve 111 on and off.

The gas range 100 provided as the illustrated embodiment of the cooking apparatus in accordance with the present disclosure may include a first transmitter 117 configured to transmit an electrical signal to the kitchen device, when thermoelectromotive force is generated in the thermos couple 113. The first transmitter 117 of the present disclosure may transmit an electrical signal wirelessly.

The first transmitter 117 is connected to the first controller 115 and controlled by the first controller 115. When the thermoselectromotive force is generated in the thermos couple 113, the first controller 115 controls the first transmitter 117 to transit an electrical signal to the first receiver 118 of the kitchen device 300.

The first controller 115 may include an amplifying circuit configured to amplify the thermoelectromotive force generated in the thermos couple 113 at a preset ratio. The first controller 115 may amplify the thermoelectromotive force with a band range in which the first controller 115 is able to measure or determine the thermoelectromotive force substantially.

The gas range 100 provided as the illustrated embodiment of the cooking apparatus in accordance with the present disclosure may include a first receiver 118.

When the second sensing unit 400 provided in the hood which will be described later senses severe smoke from the cooking food, the second transmitter 381 provided in the hood transmits an electrical signal to the first receiver 118 of the gas range 100 and the first controller 115 of the gas range 100 then controls the magnetic valve 111 to close the gas path 107 so as to shut off the gas supplied to the burner 103.

Accordingly, no more smoke may be generated in the gas range and the danger of fire which might start from the burning food may be prevented.

Hereinafter, one embodiment of the kitchen device in accordance with the present disclosure will be described.

The kitchen device includes a hood 300 configured to suck the smell or smoke of food generated in the gas range 100. The hood 300 may be provided beside or over the gas range 100 and suck the smoke and smell generated in the food cooking process.

The hood 300 has a cross section area getting broader downwards. The hood 300 may include a suction duct 320 provided in a lower portion with an open end to suck smoke and smell and an exhaustion duct 322 connected to the other end to exhaust the sucked smoke and smell. The open end (not shown) provided in the lower portion of the suction duct 320 is wide enough to cover the plurality of the burners 103 so that the smoke and smell generated and rising in the cooking process may not spread around the suction duct 320.

The hood 300 may include a fan 340 configured to suck air inwards, a motor 342 configured to drive the fan 340 and a second controller 360 configured to control the motor 342.

A conventional hood 300 includes a button exposed outside. When the user presses the button, the second controller 360 drives the motor 342 to rotate the fan 340 and air is sucked into the suction duct 320 to be exhausted outside.

The hood 300 provided as the illustrated embodiment of the kitchen device in accordance with the present disclosure may include a second receiver 380 configured to receive an electrical signal from the first transmitter 117 of the gas range 100.

When the second receiver 380 receives the electrical signal from the first transmitter 117, the second controller 360 operates the fan 340 provided in the hood 300. In other words, the second controller 360 drives the motor 342 to rotate the fan 340 and air is sucked via the suction duct 320 and exhausted outside.

Accordingly, the user cooks food using the gas range 100 and then the hood is automatically operated. No inconvenient performance that the user has to operate the hood additionally may be needed.

Meanwhile, the first controller 115 of the gas range 100 may control the first transmitter 117 to transmit the electrical signal having the information about the size of electromotive force. When the second receiver 380 received the electrical signal, the second controller 360 adjusts the rotation number of the motor 342 or the rotation number of the motor 342 to adjust the level of the air suction in the hood 300.

The hood 300 provided as the kitchen device of the illustrated embodiment in accordance with the present disclosure may include a second sensing unit 400 configured to sense smoke and a second receiver 381 configured to transmit an electrical signal to the cooking apparatus 100.

When the second sensing unit 400 senses the smoke of food, the second controller 360 increases the rotation number of the fan 340 or the number of the fans only to improve suction efficiency. In case too much smoke is generated, the smoke is exhausted outside via the hood 300 and the smoke generated by overcooked food may be prevented from getting filled in the house.

The second sensing unit 400 senses the smoke of food and the second controller 360 controls the second transmitter 381 to transit an electrical signal to the first transmitter 117 of the gas range. After that, the first controller 115 of the gas range 300 drives the magnetic valve 111 and closes the gas path.

Accordingly, the fires which might be start from the gas range may be prevented and the user's possessions and safety may be protected.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A system interworking between a cooking apparatus for cooking food and a kitchen device in communication with the cooking apparatus, the system comprising:
a cooking apparatus comprising a heat source configured to generate heat for cooking food; a first transmitter configured to transmit an electrical signal to the kitchen device; and a first controller configured to control the first transmitter to transmit the electrical signal to the kitchen device; and
a kitchen device comprising a second sensing unit configured to sense smoke of food; an alarm unit configured to send a user information, and a second controller configured to control the alarm unit to send the user a message based on the second sensing unit sensing the smoke of food,
wherein the kitchen device is a hood that comprises a fan controlled by the second controller to suck a smell of food being cooked by the heat source, and
wherein the second controller is configured to switch on the fan based on operation of the heat source.

2. The system interworking between the cooking apparatus and the kitchen device of claim 1, wherein the kitchen device further comprises a second receiver configured to receive the electrical signal transmitted by the first transmitter;
wherein the second controller is configured to control the driving of the kitchen device according to the electrical signal received by the second receiver.

3. The system interworking between the cooking apparatus and the kitchen device of claim 2, wherein the cooking apparatus further comprises,
a first sensing unit connected to the first controller and configured to sense operation of the heat source, and
wherein the first controller is configured to control the first transmitter to transmit an electrical signal to the kitchen device, based on the first sensing unit sensing the operation of the heat source.

4. The system interworking between the cooking apparatus and the kitchen device of claim 3, wherein the heat source is configured to emit thermal energy, using electricity or gas, and the first sensing unit is configured to sense the thermal energy.

5. The system interworking between the cooking apparatus and the kitchen device of claim 4, wherein the first sensing unit is a thermo couple configured to generate electromotive force based on heat from the thermal energy emitted by the heat source.

6. The system interworking between the cooking apparatus and the kitchen device of claim 5, wherein the cooking apparatus comprises,
an amplifying circuit configured to amplify the electromotive force generated by the thermo couple.

7. The system interworking between the cooking apparatus and the kitchen device of claim 6, wherein the hood is provided near the cooking apparatus.

8. The system interworking between the cooking apparatus and the kitchen device of claim 3, wherein the second controller is configured to switch on the fan based on the second receiver receiving the electrical signal from the first transmitter.

9. The system interworking between the cooking apparatus and the kitchen device of claim 5, wherein the first controller is configured to control the first transmitter to transmit an electrical signal having information about a size of the electromotive force generated by the thermo couple to the second receiver, and
the second controller is configured to control a rotation number of the fan according to the electrical signal having the information about the size of the electromotive force received by the second receiver.

10. The system interworking between the cooking apparatus and the kitchen device of claim 3, wherein the electrical signal is transmitted from the first transmitter to the second receiver wirelessly.

11. The system interworking between the cooking apparatus and the kitchen device of claim 3, wherein the second controller is configured to increase a rotation number of the fan, based on the second sensing unit sensing the smoke of food.

12. The system interworking between the cooking apparatus and the kitchen device of claim 3, wherein the alarm unit is configured to send a user information using sound or screen, and
- the second controller is configured to control the alarm unit to send the user a message of sound or screen, based on the second sensing unit sensing the smoke of food.

13. The system interworking between the cooking apparatus and the kitchen device of claim 3, further comprising:
- a second transmitter provided in the kitchen device and configured to transmit an electrical signal to the cooking apparatus, based on the second sensing unit sensing the smoke of food; and
- a first receiver provided in the cooking apparatus and configured to receive the electrical signal transmitted from the kitchen device, and
- the first controller is configured to stop the operation of the heat source according to the electrical signal received by the first receiver.

* * * * *